No. 722,377. PATENTED MAR. 10, 1903.
J. G. MOOMY.
PNEUMATIC TIRE.
APPLICATION FILED JULY 19, 1902.
NO MODEL.
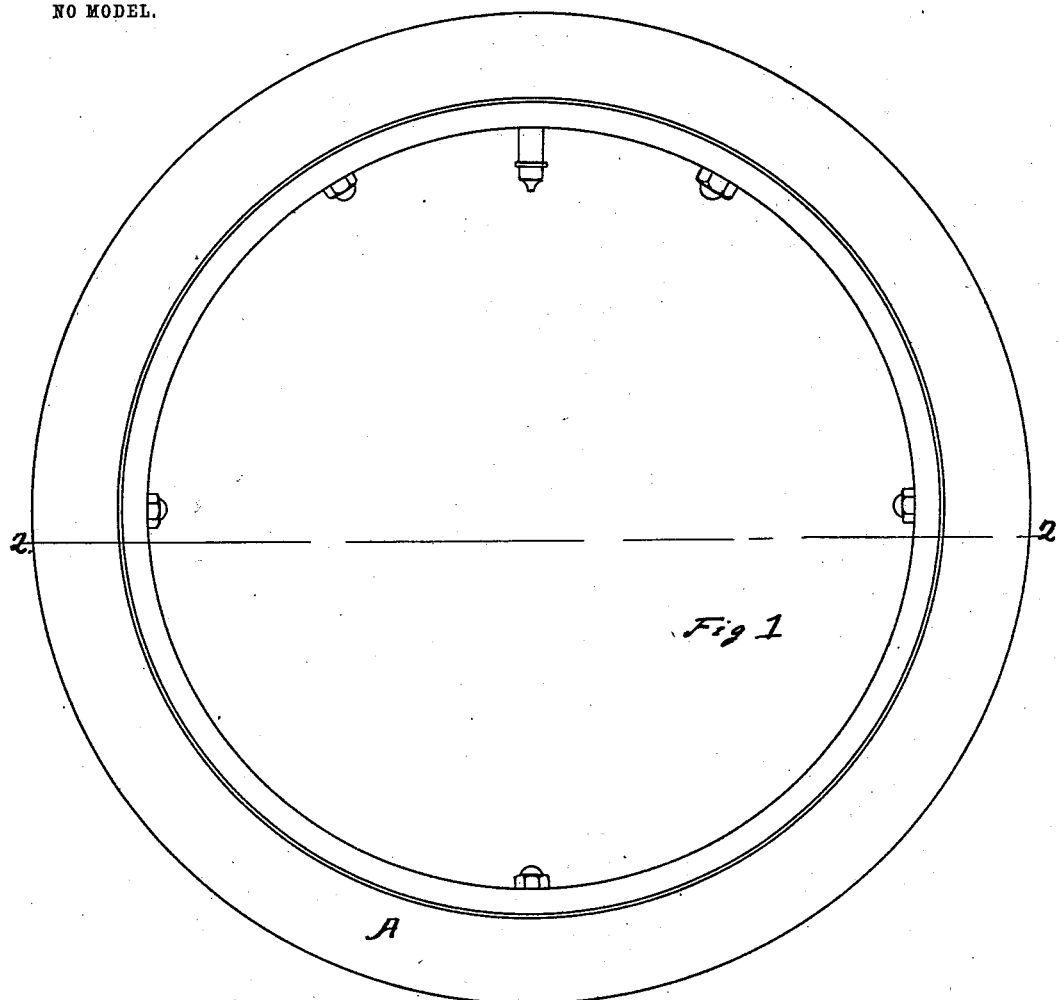
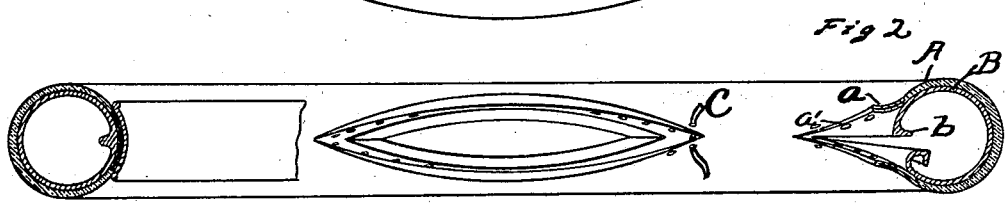

UNITED STATES PATENT OFFICE.

JOSEPH G. MOOMY, OF ERIE, PENNSYLVANIA.

PNEUMATIC TIRE.

SPECIFICATION forming part of Letters Patent No. 722,377, dated March 10, 1903.

Application filed July 19, 1902. Serial No. 116,200. (No model.)

*To all whom it may concern:*

Be it known that I, JOSEPH G. MOOMY, a citizen of the United States, residing at Erie, in the county of Erie and State of Pennsylvania, have invented new and useful Improvements in Pneumatic Tires, of which the following is a specification.

This invention relates to pneumatic tires; and it consists in certain improvements in the construction thereof, as will be hereinafter fully described, and pointed out in the claims.

The invention is illustrated in the accompanying drawings, as follows:

Figure 1 shows a side elevation of the tire; Fig. 2, a section on the line 2 2 in Fig. 1.

A marks the outer wall or jacket of the tire; B, the air-tube. These are preferably formed together by vulcanization. The inner periphery of the cover A has the flap $a$, which is preferably not secured to the air-tube B. This is provided with the lace-hole $a'$. A lace C is used for closing the cover along the slits. The opening may be continuous or only for a short distance, as desired, preferably only for short distances. Along the inner periphery of the air-tube there is a reinforcing-strib $b$ of rubber, either cured or raw, preferably partially cured—that is, cured softer or left more nearly in the raw state than the body of the tire. This reinforcing-strip should be of sufficient thickness to permit of the closing of the air-tube by an edge-to-edge joint. In forming the tire this reinforcing-strip is preferably made in one piece. When it is desired to repair the air-tube, this reinforcing-strip is cut as indicated in Fig. 2 and the patch introduced through the opening so made. The edges of the reinforcing-strip are then cemented together, thus forming a complete closure.

What I claim as new is—

1. In a pneumatic tire, the combination of the outer cover A, having a flap $a$; the inner tube B, having the reinforcing-strip $b$, formed of an integral piece of partly-cured rubber and of a thickness sufficient to make an edge-to-edge joint.

2. In a pneumatic tire, the combination of the outer cover A, having a flap $a$; the inner tube B, having the reinforcing-strip $b$, of a thickness sufficient to make an edge-to-edge joint, said strip being of partially-vulcanized material.

In testimony whereof I have hereunto set my hand in the presence of two subscribing witnesses.

JOSEPH G. MOOMY.

Witnesses:
J. E. REED,
U. G. YARD.